United States Patent
Perkins

[11] 3,979,854
[45] Sept. 14, 1976

[54] TRAP FOR CRAWLING INSECTS AND THE LIKE

[76] Inventor: Everett F. Perkins, 40850 Old Three Rivers Drive, Three Rivers, Calif. 93271

[22] Filed: May 27, 1975

[21] Appl. No.: 581,142

[52] U.S. Cl. .................................. 43/121
[51] Int. Cl.² .............................. A01M 1/10
[58] Field of Search ........................ 43/121

[56] References Cited
UNITED STATES PATENTS

| 15,982 | 10/1856 | Moulton | 43/121 |
| 1,248,337 | 11/1917 | Johnson | 43/121 |

Primary Examiner—Louis G. Mancene
Assistant Examiner—Daniel J. Leach

[57] ABSTRACT

A trap having a receptacle forming a fluid receiving reservoir with a mouth communicating therewith, a fastener attached to the receptacle and extending substantially centrally through the reservoir and mouth for attaching the receptacle to a support in depending relation with the mouth disposed in substantially upwardly facing relation, and a second fastener borne by the receptacle for supporting an object to be protected in depending relation thereon.

1 Claim, 4 Drawing Figures

TRAP FOR CRAWLING INSECTS AND THE LIKE

BACKGROUND OF THE INVENTION

1. Field of the Invention

The present invention relates to a trap for crawling insects and the like and more particularly to such a trap which is adapted to isolate objects to be protected, such as potted plants, bird feeders and food goods, from attack by crawling insects, spiders and the like which are attracted to such objects.

2. Description of the Prior Art

The susceptibility of plant life, food goods, camping supplies, fish bait, game and other organic materials to attack by insects, spiders and other surface borne creatures is frequently considerable depending upon how they are used and stored. This susceptibility results from the capability of such creatures to crawl up vertical surfaces, along the undersides of horizontal structures and into confined spaces. These capabilities coupled with their instinct for locating food substances has made the protection of such materials extremely difficult. Thus, for example, it is known in camping to suspend containers of food from tree limbs in an attempt to isolate such containers from crawling insects and animals. However, insects are frequently able to locate and gain access to such containers notwithstanding their isolated locations. Similarly, with other objects such as hanging potted plants and bird feeders, this same difficulty exists. The prior art, such as represented by the Scribner U.S. Pat. No. 1,063,395; the Lindecker U.S. Pat. No. 2,051,800; the Wright U.S. Pat. No. 2,356,022; and the Du Mond et al. U.S. Pat. No. 3,441,003, disclose prior art devices which deal with peripherally related problems not directly applicable to the problem here presented.

Therefore, it has long been known that it would be desirable to have a device which can be employed to support objects so as to preclude access thereto by surface borne insects, spiders and the like and which is of a compact, durable construction suitable for use in a wide variety of environments throughout a long operational life.

SUMMARY OF THE INVENTION

It is therefore an object of the present invention to provide an improved trap for surface borne insects, spiders and the like.

Another object is to provide such a trap which is adapted to support a variety of types of objects, such as containers of food, potted plants, bird feeders, camping supplies, fish bait, game and the like which are attractive to, and subject to damage by, crawling insects and the like, so as to preclude access thereto by such crawling creatures thereby preserving such objects from damage.

Another object is to provide such a trap which employs a fluid barrier impassable to crawling creatures.

Another object is to provide such a trap which can be constructed in a variety of operative embodiments particularly well suited to specific uses.

Another object is to provide such a trap which is of a durable construction adapted to support even relatively heavy objects while itself being compact and lightweight.

Another object is to provide such a trap which is particularly well suited in camping to the preservation of food, supplies and the like permitting the support of such materials on an available means of support, such as a tree limb, and which is of lightweight construction and permits disassembly for compact storage thus enhancing its portability.

Another object is to provide such a trap which can easily be manufactured and sold in a variety of embodiments at minimal cost.

Another object is to provide such a trap which has an aesthetically pleasing appearance so as not to detract from the ornamental effect afforded by objects such as potted plants supported thereon.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 3:
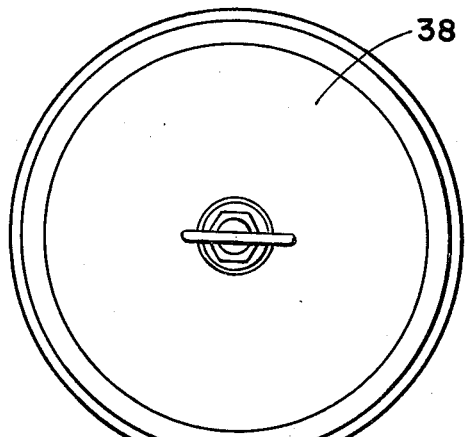
FIG. 3 is a somewhat further enlarged top plan view of the trap.

Referring more particularly to the drawing, the trap of the present invention is generally indicated by the numeral 10. The trap is shown in a representative operative environment in FIG. 1, wherein a suitable support 11, such as a beam, tree limb or the like is shown in dashed lines and mounts an eye fastener 12. It will be recognized that a variety of fasteners could be employed in place of the eye fastener including simply a line lashed about a support. For illustrative convenience, a bird feeder is represented in dashed lines at 13 supported on the trap. The feeder typifies loads that can be supported on, and protected by, the trap. Food containers, potted plants, and other objects not shown similarly benefit by being supported on the trap.

As will be seen, the trap 10 of the present invention can be constructed in a variety of embodiments individually designed for particular uses. However, the embodiment of the invention shown in the drawing and described herein is well suited to virtually all uses and is therefore the preferred embodiment.

The trap 10 has a cup-shaped container or receptacle 25. The receptacle can, of course, be constructed of any suitable material such as metal, plastic, or the like. However, it is preferably constructed of a rigid transparent plastic material for purposes subsequently to be described. The receptacle has a substantially flat floor 26 having an interior surface 27 and an exterior surface 28. The floor has a central bore 29 extending substantially axially therethrough and a substantially circular peripheral edge 30.

The receptacle 25 has an inverted frustoconical side wall 35 integrally mounted on the peripheral edge 30 of the floor 26 extending continuously thereabout. The side wall has an interior surface 36 and an exterior surface 37. The side wall, with the floor, defines a fluid reservoir 38 within the receptacle. The side wall has an upper edge 39 defining a mouth 40 for the receptacle communicating with the reservoir.

An elongated body member 50, having opposite ends 51 is mounted on and extends substantially axially through the receptacle 25. The body has a cylindrical sleeve 52 mounted on the interior surface 27 of the floor 26 and extending in substantially coaxial relation concentrically about the central bore 29. The sleeve has an internal passage 53 and a remote end 54 which extends beyond the upper edge 39 of the side wall 35. The sleeve is preferably mounted on the floor in fluid sealing relation as by means of a suitable adhesive or actually molded as an integral part of the receptacle.

The body 50 is further composed of a bolt 60 having an externally screw-threaded end portion 61, a central flange 62 and a fastener or hook 63. The bolt is extended through a seal 64, through the central bore 29, the internal passage 53 of the sleeve 52 and outwardly through the remote end 54 of the sleeve. A washer 65 is positioned about the screw-threaded end portion of the bolt and a nut 66 is screw-threadably received on the end portion 61 and tightened into engagement with the washer thereby to force the washer into engagement with the remote end 54 of the sleeve. The bolt is thus secured in position with the hook 63 extending outwardly from the exterior surface 28 of the floor 26. The seal 64 acts to cushion engagement of the flange 62 with the floor and insure a fluid-tight seal. An internally screw-threaded fastener or hook 67 is screw-threadably secured on the outwardly extending end portion 61 of the bolt 60 and tightened into engagement with the nut 66. Thus, the body member 60 is provided with opposite ends 51 individually mounting the hooks 63 and 67 respectively. As shown for illustrative convenience in FIGS. 1 and 2, a fluid 68 is contained within the reservoir 38 of the receptacle 25. The fluid may, of course, be an insecticide in liquid or powder form, but for purposes of safety and convenience water is normally preferred and is found to be quite adequate.

As previously discussed, the embodiment shown in the drawing and described herein is preferred due to its versatility of use. However, it is important to note that other embodiments of the invention may be more desirable for specific applications of use. For example, in camping where food containers 15 are to be suspended thereon, and where light weight and compact storage are desired, such as where supplies are transported by back pack, another embodiment of the invention, not shown in the drawing, may be preferred. Thus, the receptacle 25 can be constructed in a cup shape as shown in the drawing but without the central bore and elongated body structure 50 heretofore described. A suitable fastener, such as an eyelet, can be mounted on each surface 27 and 28 respectively of the floor 26. Thereupon, a cord, rope, chain or the like can individually be extended through the eyelets for attachment to the support 11 and for attachment to the tie line 16 for the food container 15. This construction permits the cords to be removed from their eyelets and a plurality of such receptacles 25 to be disposed in nested relation with respect to each other for ease of storage.

OPERATION

Figure 1:
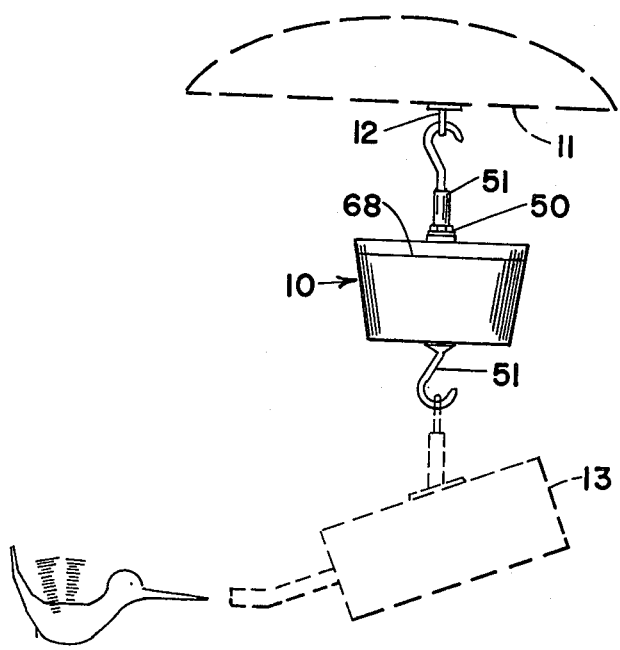
FIG. 1 is a side elevation of the trap of the present invention shown in a representative operative environment with a bird feeder and a food container alternatively represented in dashed lines as supported thereon.
Figure 2:
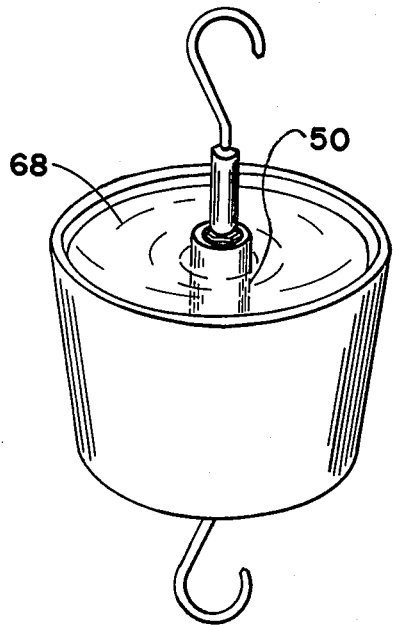
FIG. 2 is a somewhat enlarged perspective view of the trap showing fluid retained therein.
Figure 4:
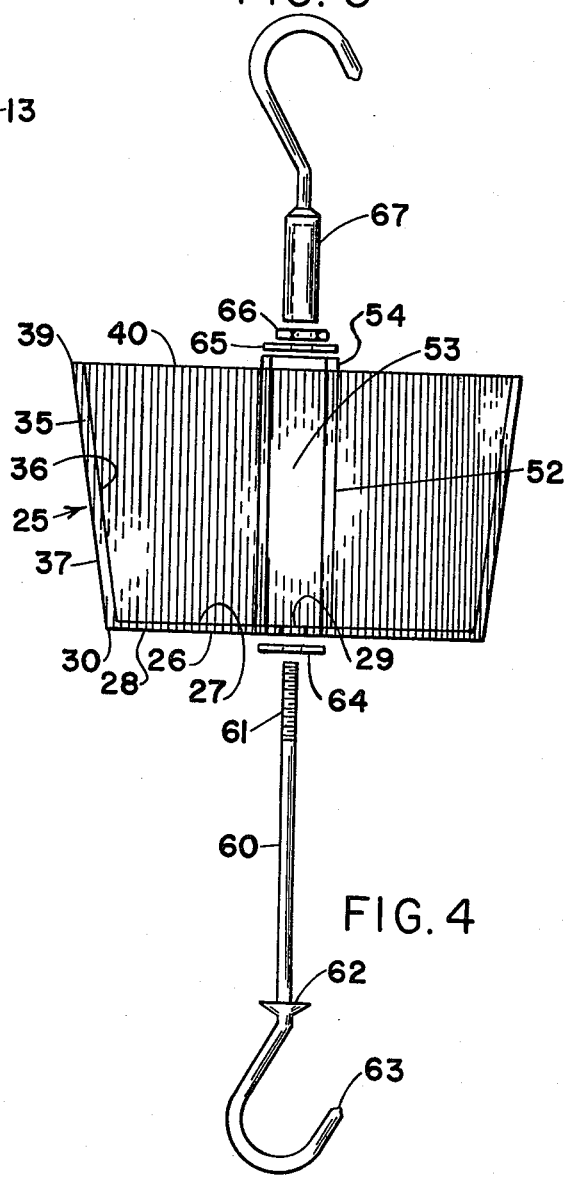
FIG. 4 is an exploded view of the trap.

The operation of the described embodiment of the subject invention is believed to be clearly apparent and is briefly summarized at this point. As heretofore set forth, the trap 10 of the present invention can be used in a variety of environments for the support of objects to be protected from surface borne insects, spiders and other crawling creatures. As illustrated in FIG. 1, fluid 68 is simply placed in the reservoir 38 of the receptacle 25 and the hook 67 is inserted through the eye fastener 12 so as to support the trap in depending relation on the support 11. Thereafter, the object to be protected, such as the bird feeder 13, is simply suspended on hook 63.

If crawling insects, spiders or the like are able to reach the support 11, the fluid 68 received in the reservoir 35 acts as a barrier thereby preventing them from passing to the hook 63 and the object supported thereon. In the case of objects such as potted plants, bird feeders, or the like which are to be retained in the suspended position virtually indefinitely, the only maintenance required is to replenish the supply of fluid 68 within the reservoir which may be lost due to evaporation or spilling. In such usage, the transparency of the receptacle, as described, facilitates observation of the fluid level. In the preferred form of the invention shown in the drawing and described herein, the interlocking assembly of the bolt 60 with the hook 67 so as to capture the receptacle securely therebetween permits the trap to support the maximum amount of weight while minimizing the weight, complexity of structure and thus expense of the trap itself.

Therefore, the trap of the present invention is adapted dependably and securely to support a wide variety of types of objects so as to protect them from attack by surface borne creatures, such as insects, spiders and the like, and is of compact, durable and lightweight construction facilitating use and insuring a long operational life.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A trap for crawling insects and the like comprising a bolt having a screw-threaded end portion, a fastener remote from said end portion and a flange disposed between the end portion and fastener; a receptacle received about the bolt in engagement with the flange and having a fluid reservoir facing away from said fastener; and a second fastener screw-threadably secured on the end portion of the bolt to capture the receptacle between said fasteners.

* * * * *

UNITED STATES PATENT AND TRADEMARK OFFICE
CERTIFICATE OF CORRECTION

PATENT NO. : 3,979,854
DATED : September 14, 1976
INVENTOR(S) : Everett F. Perkins It is certified that error appears in the above-identified patent and that said Letters Patent are hereby corrected as shown below:

Column 3, Line 31,

After "member" delete "60" and insert --- 50 ---.

Signed and Sealed this

Twenty-third Day of November 1976

[SEAL]

Attest:

RUTH C. MASON
*Attesting Officer*

C. MARSHALL DANN
*Commissioner of Patents and Trademarks*